Feb. 16, 1954     E. MILLER     2,669,267
HANDSAW WITH PARALLEL BLADES
Filed April 6, 1951
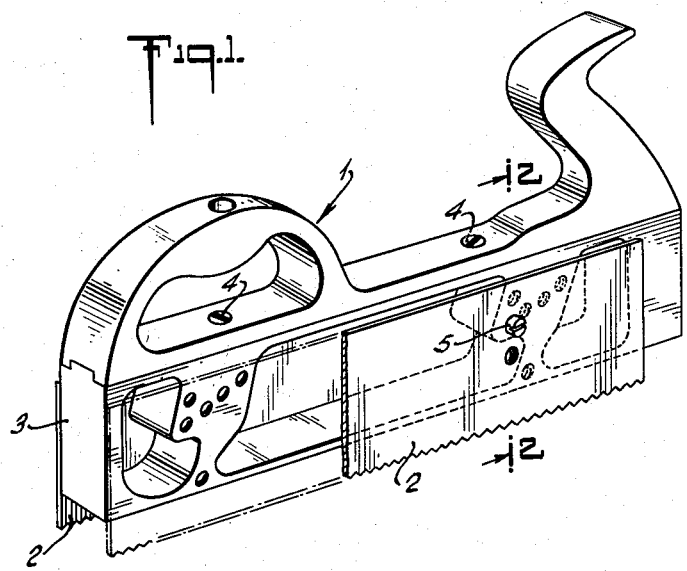
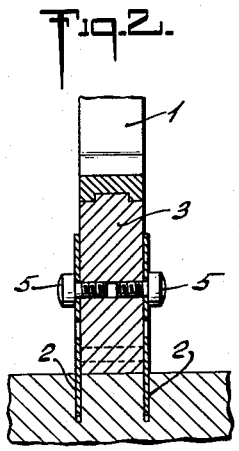
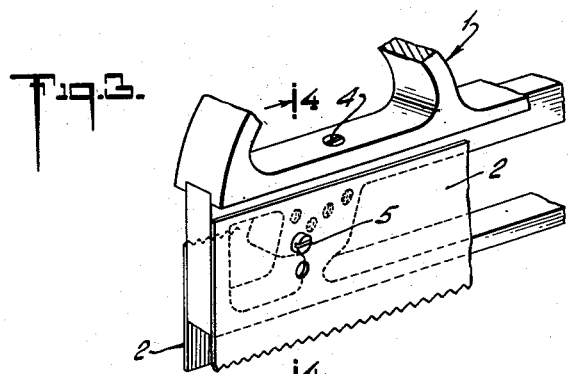
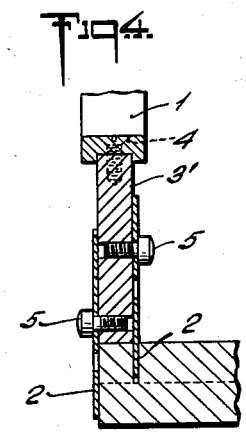
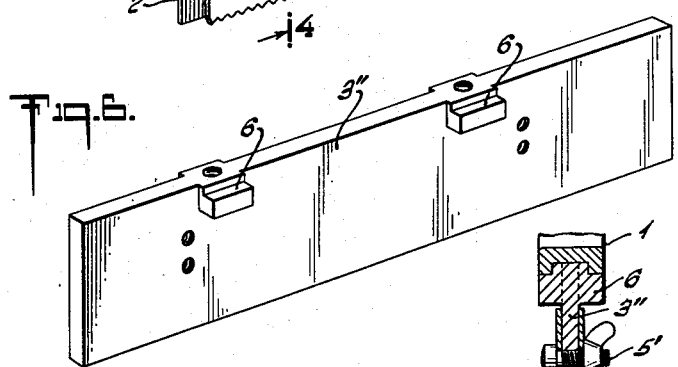
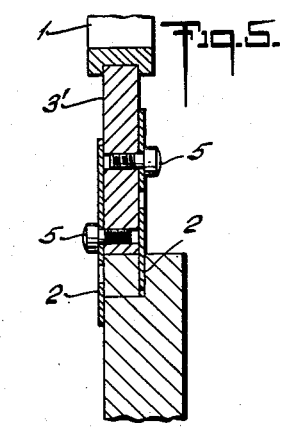
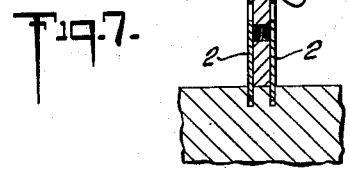
INVENTOR
Edward Miller Patented Feb. 16, 1954

2,669,267

UNITED STATES PATENT OFFICE 2,669,267

HANDSAW WITH PARALLEL BLADES

Edward Miller, North Salem, N. Y.

Application April 6, 1951, Serial No. 219,562

2 Claims. (Cl. 145—31)

The invention relates particularly to a two-bladed saw, and the purpose of the invention is to provide means for cutting slots or kerfs preparatory to rabbeting of wood material by mounting two similar saw-blades in parallel relation on a plurality of spacer frames of such thicknesses as to comply preferably with standard thicknesses of milled lumber and plywood; and to be mounted on spacer frames so that each saw will cut the same depth slot, or otherwise, as placed on the spacer frame. Material between the saw slots is removed by a chisel or other known means. Also to be able to use one of the two blades as a parallel guide for the other when used as a rabbeting saw. The embodiment of the invention is illustrated in the accompanying drawings in which—

Fig. 1 is a perspective view of the dual saw with one blade left off to expose one side of a frame and to show how blades are mounted.

Fig. 2 is a transverse sectional view of two saw blades mounted on the frame 3.

Fig. 3 is a perspective view of one saw 2 mounted on the frame in a position to cut a slot of certain depth, and on the opposite side a saw blade 2 mounted with its cutting edge inverted, hereinafter explained.

Figs. 4 and 5 are transverse sectional views of Fig. 3 with the work in different positions.

Fig. 6 is a perspective view of a different sized frame, and

Fig. 7 is a transverse sectional view of the saw with the frame of Fig. 6 in place.

Similar numerals refer to similar parts throughout the drawings. The dual saw comprises a separate handle 1 preferably made of metal such as aluminum and its alloys, having an upwardly and forwardly projected handle at one end, and at the other end a loop-shaped handle whereby the saw can be manipulated by two hands. On the lower edge of the handle 1 a longitudinal slot or groove is provided as shown. Frames 3 preferably of similar metal and of different thicknesses on which the saws 2 are mounted, fit into said groove and are secured by screws 4.

The two saw blades 2 are similar, having perforations by which they are fastened to frames 3 by screws 5 on each side of all frames according to the work to be performed. At two places on frames 3 and 3', Fig. 1 and Fig. 3, are transversely threaded holes which are diagonally placed to lessen height of frames, and progressively spaced in order to raise or lower the saw or saws in relation to the lower edge or edges of frames governing the depth of cut, such depths being indicated by markings in fractions of an inch on the frames.

When it is desired to cut one slot at right angles to another as in Figs. 4 and 5 such as a lip or rabbet as required in cabinet doors, drawer faces and the like, one saw is used on one side of a frame 3' and on the opposite side a second saw blade is inverted and placed by its respective perforations by screws 5 at a position on the frame to provide a lowered portion of the inverted saw blade to act as a guide or fence against the face or edge of material to be cut.

The purpose of inverting one saw blade is to prevent the scoring of the surface of the work by its teeth.

The method of securing the saw blades 2 on the frames 3 permits of no slippage as regards depth of cut when pressure is applied. Fig. 6 is a longitudinal view and Fig. 7 a transverse view of a saw frame 3" of such thickness as to conform to the use of ¼" plywood, yet of such thinness as to require a thickness at 6 for the screw holes, and fits into slot or groove of handle 1 as shown in Fig. 1 and Fig. 3.

I claim:

1. A saw, including, in combination, an elongated handle, a spacer member corresponding in length to the handle, a longitudinal tongue and groove fitting between the bottom on the handle and the top of the spacer frame, means to secure the handle and the spacer frame together, plane members, one positioned on each side of the spacer frame, the bottom edges of said plane members extending below the bottom of the spacer frame and at least one of the plane members having its lower edge formed into saw teeth, a plurality of screw threaded holes in each end of each face of the spacer frame, the holes on each end of each side face being similarly arranged and the holes in one end of any one side face each being at a different distance from the bottom of the spacer frame, said plane members each formed with two through bores, said bores being spaced apart a distance of two through threaded holes on the same face of the spacer frame which are each of the same distance from the bottom face of the spacer frame and four screws, one passing through each through bore in a plane member and into a screw threaded hole in the spacer frame.

2. A saw, including, in combination, an elongated member provided on the upper portion with handle means, said member formed with two through bores each adapted to receive a screw, said member further formed on the lower surface with a longitudinal groove adapted to receive a projection therein, a spacer frame formed with a longitudinal rabbet on each top edge forming a projection, said projection adapted to fit into the said groove, said spacer frame formed in its top face with two threaded holes adapted to receive threaded screws, threaded screws passing through the elongated member and screw threaded into the spacer frame whereby the spacer frame and elongated member are held rigidly together, said spacer frame in each side face at each end having a plurality of screw threaded holes therein similarly arranged, said holes at any one end each being spaced at different distances from the bottom face of the spacer frame, two plane members, one on each side of the spacer frame, said plane members each formed with two through bores, each adapted to receive a screw, said through bores being spaced apart longitudinally of the plane members the same distance as any two screw threaded holes in any side face of the spacer frame, one in one end of the spacer frame and one in the other end of the spacer frame and both the same distance from the bottom of the spacer frame, are spaced apart longitudinally, four screws, one passing through each of the through bores in each of the plane members and into a screw threaded hole in the spacer frame, whereby the plane members may be securely attached to the side faces of the spacer frame, said plane members being of such width that when attached to the spacer frame they extend down below the bottom thereof in various amounts depending upon which screw threaded holes of the spacer frame are utilized, at least one of the plane members having the edge below the spacer frame formed into saw teeth.

EDWARD MILLER.

References Cited in the file of this patent
UNITED STATES PATENTS

| Number | Name | Date |
|---|---|---|
| 52,478 | Whitker | Feb. 6, 1866 |
| 170,010 | McLeod | Nov. 16, 1875 |
| 1,228,728 | White | June 5, 1917 |
| 1,421,052 | White | June 27, 1922 |
| 1,712,008 | Rice | May 7, 1929 |
| 2,320,539 | Weddle et al. | June 1, 1943 |